United States Patent

Satou et al.

[11] Patent Number: 5,909,517
[45] Date of Patent: Jun. 1, 1999

[54] IMAGE READING DEVICE WITH DIGITIZING CONDITION ADJUSTING CAPABILITY

[75] Inventors: Tatsuya Satou, Nagoya; Tetsuya Kato, Nago, both of Japan

[73] Assignee: Brother Kogyo Kabushiki Kaisha, Nagoya, Japan

[21] Appl. No.: 08/655,486

[22] Filed: May 30, 1996

[30] Foreign Application Priority Data

| May 30, 1995 | [JP] | Japan | 7-131585 |
| May 30, 1995 | [JP] | Japan | 7-131586 |
| Jun. 6, 1995 | [JP] | Japan | 7-139211 |

[51] Int. Cl.⁶ .................................................. H04N 1/40
[52] U.S. Cl. .......................... 382/274; 358/445; 358/461; 358/475
[58] Field of Search .............................. 382/274; 358/461, 358/445, 446, 406, 471, 474, 475, 504, 505, 455; 341/131, 155, 156, 158, 172

[56] References Cited

U.S. PATENT DOCUMENTS 4,516,174  5/1985  Kammoto ................................. 358/446
5,111,311  5/1992  Yamamoto ............................... 358/461

Primary Examiner—Scott Rogers
Attorney, Agent, or Firm—Oliff & Berridge, PLC

[57] ABSTRACT

In an image reading device including an LED array, an image sensor, and an A/D converter, an initial digitizing condition is first set while determining whether or not the initial digitizing condition to be set meets a first criteria. Then, the initial digitizing condition is adjusted so as to meet the second a second criteria. An example of the digitizing condition is a high reference voltage applied to the A/D converter which converts an analog voltage ranging from a low reference voltage to the high reference voltage to a digital value. The second criteria is provided for, for example, reducing an S/N ratio when the image reading device reads half-tone images.

8 Claims, 12 Drawing Sheets

| a | b | c |
|---|---|---|
| d | e | f |
| g | h | i |

IMAGE READING DEVICE WITH DIGITIZING CONDITION ADJUSTING CAPABILITY

BACKGROUND OF THE INVENTION

1. Field of the Invention

The present invention relates to an image reading device for reading images including characters, diagrams, figures and the like and converting the images to digital data. More particularly, the invention relates to an image reading device capable of adjusting digitizing conditions for an analog signal fed from an image sensor, such as a high reference voltage of an analog-to-digital converter which converts the analog signal to a digital signal.

2. Description of the Related Art

Image reading devices are incorporated into various equipments, such as facsimile devices. A conventional image reading device includes an LED array for irradiating light onto the surface of an original document to be read, and an image sensor for reading the image on the original document. The image sensor reads the image by picking up the light reflected from the surface of the original document. The image sensor outputs an analog signal having a voltage level determined depending on the density of the image. An analog-to-digital (A/D) converter is further included in the image reading device, which converts the analog signal to a digital signal.

In order to improve the tone gradation of the reproduced image particularly when a half-tone images are read with the image sensor, there has been proposed to adjust the high reference voltage of the A/D converter. This has been done by the provision of a voltage division circuit with which the analog signal fed from the image sensor is subjected to a voltage division. The resultant voltage divided signal is applied to the AID converter for digitizing the same. Based on the digital signal obtained from the A/D converter, the high reference voltage of the A/D converter is adjusted. However, there is a problem in the image reading devices with such a digitizing condition adjusting capability such that the provision of the voltage division circuit increases the manufacturing cost of the image reading device.

Further, image reading device provided with a filter circuit have been known in the art. The filter circuit is provided to enhance or emphasize the density of a picture element (pixel) depending on the density levels of the pixels adjacent to the pixel in question. By filtering the digital signal output from the A/C converter with the filter circuit, fine lines or low density lines can be reproduced. However, because the high reference voltage of the A/D converter is set to low when reading the original documents with high density background, the dynamic range of the analog signal input to the A/D converter is small and accordingly an S/N ratio of the digital signal output from the A/D converter is degraded. Filtering processing to such digital signal results in enhancing or emphasizing even noise components.

It has also proposed in the art to adjust the low reference voltage of the A/D converter which is a criteria for determining the A/D converted data corresponding to the black level image. To this effect, the conventional image reading device employs a Zenor diode to cut the d.c. component of the analog signal output from the image sensor. However, there are variations in the Zenor voltage caused by the variation in the Zenor diodes per se and also by the changes in the environmental temperature. In order to remedy the variation in the black level analog signal caused by the variation in the Zenor voltage, the low reference voltage of the A/D converter is adjusted to meet the black level analog signal actually applied to the A/D converter. Specifically, the digital signal representative of the black image is applied to an image processing circuit connected to the output of the A/D converter, and the output from the image processing circuit is converted to an analog signal by virtue of a digital-to-analog (D/A) converter and the resultant analog signal is used as the low reference voltage of the A/D converter. The D/A converter connected at its output to the low reference voltage terminal of the A/D converter must be of low output impedance so as to impedance match with the low reference voltage terminal of the A/D converter that is low in input impedance. That is, the available D/A converters for connection between the image processing circuit and the low reference voltage input terminal of the A/D converter must be low in output impedance. However, such A/D converters are expensive and so the use thereof is a cause of increase of the manufacturing cost.

SUMMARY OF THE INVENTION

In view of the foregoing, the present invention has been made to solve the above-mentioned problems in the conventional image reading devices. Accordingly, it is an object of the present invention to provide an image reading device which, when half-tone images are read, can adjust a high reference voltage of an A/D converter which converts an analog signal fed from an image sensor to a digital signal without requiring a voltage division circuit.

Another object of the present invention is to provide an image reading device which can be manufactured at low cost.

Still another object of the present invention is to provide an image reading device which can enhance the contrast of the image even if the original document has a high density background.

Yet another object of the present invention is to provide an image reading device in which the black level can be adjusted when digitizing the analog signal with a circuit of low cost.

The above and other objects of the present invention can be achieved by an image reading device including a light source, image reading means, an A/D converter, initial digitizing condition setting means, and digitizing condition adjusting means. The light source emits light toward a surface of a sheet member. The image reading means receives light reflected from the surface of the sheet member and outputs an analog signal. The voltage level of the analog signal depends on the density of the surface of the sheet member and an amount of light emitted from the light source. When the image reading means receives light reflected from a surface of an original document carrying an image thereon, the image reading means outputs an analog image signal. The image on the original document has a density level falling within a range from a black level to a white level. The A/D converter has a first input terminal and a second input. To the first input terminal a low reference voltage is applied and to the second input terminal a high reference voltage is applied. The A/D converter converts an analog voltage ranging from the low reference voltage to the high reference voltage to a digital signal. The initial digitizing condition setting means sets an initial digitizing condition while determining whether or not the initial digitizing condition to be set meets a first criteria. The initial digitizing condition setting means outputs a reference digital signal when the initial digitizing condition setting means determines that the initial digitizing condition meets the first criteria. The digitizing condition adjusting means adjusts the initial digitizing condition based on the reference digital signal so as to meet a second criteria. As such, the analog image signal output from the image reading means is digitized in accordance with the adjusted digitizing condition.

In one example, the initial digitizing condition setting means sets a level of the high reference voltage applied to the second input terminal of the A/D converter and the amount of light to be emitted from the light source as the initial digitizing condition. The initial digitizing condition setting means applies a predetermined high reference voltage to the second input terminal of the A/D converter and determines the amount of light to be emitted from the light source while referring to the digital signal output from the A/D converter when the image reading means receives light reflected from a reference sheet member having a predetermined reflection factor. In this case, the digitizing condition adjusting means adjusts the high reference voltage applied to the second input terminal of the A/D converter.

In another example, the initial digitizing condition setting means sets, as the initial digitizing condition, the voltage level of the analog signal applied to the A/D converter. The initial digitizing condition setting means applies a voltage level corresponding to an image having a black level.

According to another aspect of the present invention, there is provided an image reading device including the light source, the image reading means, the A/D converting means as described above, and further includes high reference voltage adjusting means, light amount adjusting means, and light amount decreasing means. The high reference voltage adjusting means adjusts the high reference voltage applied to the second terminal of the A/D converter, and the light amount adjusting means adjusts the amount of light emitted from the light source so that the voltage level of the analog signal output from the image reading means falls within a predetermined range when the image reading means receives light reflected from a reference sheet member having a predetermined reflection factor. The light amount decreasing means provides a light amount decreased condition that is created by decreasing at a predetermined ratio an adjusted amount of light emitted from the light source resulting from adjustment by the light amount adjusting means. Before reading half-tone images, the high reference voltage adjusting means adjusts the high reference voltage based on a reference digital signal output from the A/D converter when the image reading means receives light reflected from the reference sheet member under the light amount decreased condition.

According to still another aspect of the present invention, there is provided an image reading device including the light source, the image reading means, the A/D converting means as described above, and further includes background density detection means, filtering means and enhancement varying means. The background density detection means detects the background density of the original document based on the digital signal output from the A/D converter. The filtering means is connected to the A/D converter to receive the digital data therefrom. The filtering means enhances the density level of a picture element in question relative to density levels of picture elements adjacent to the picture element according to one of a plurality of enhancing coefficient. The enhancement varying means varies the enhancing coefficient based on the background density signal output from the background density detection means.

According to further aspect of the present invention, there is provided an image reading device including the light source, the image reading means, the A/D converting means as described above, and further includes a level adjusting means and control means. The level adjusting means is connected to the image reading means and adjusts the voltage level of the analog signal in accordance with an adjusting coefficient. The A/D converter is connected to the level adjusting means. The control means controls the level adjusting means to change the adjusting coefficient in accordance with a digital signal output from the A/D converter when the image reading means reads an image of the black level.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENTS

Preferred embodiments of the present invention will be described with reference to the accompanying drawings.

Figure 1:
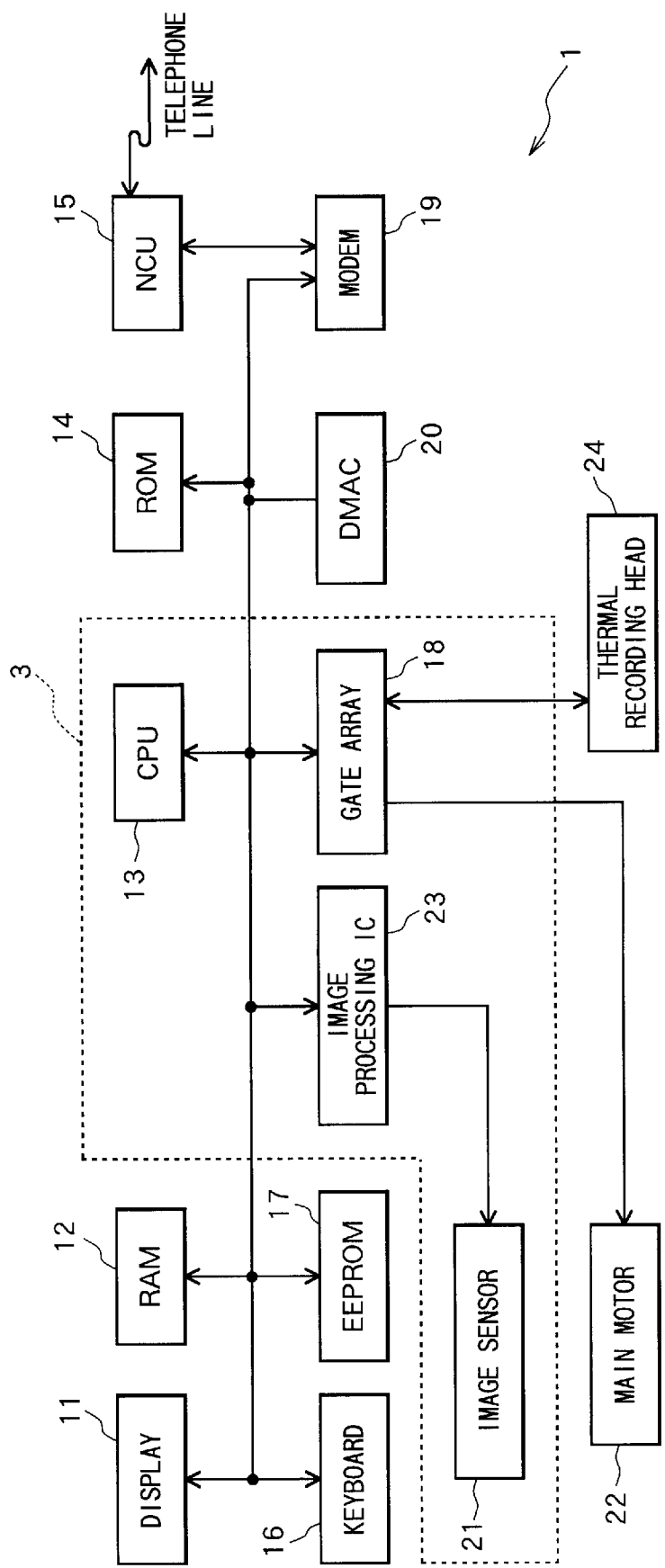
FIG. 1 is a block diagram showing a facsimile device incorporating the image reading device according to a first embodiment of the present invention.

FIG. 1 shows a block diagram showing a facsimile device incorporating an image reading device according to a first embodiment. The facsimile device 1 includes an image reading device 3. The image sensor 21, an LED (light emitting diode) array 25 (see FIG. 2), an image processing IC 23, a gate array 18, and a CPU (central processing unit) 13 constitute the image reading device 3. An image sensor 21 formed from CCDs (charge coupled devices) is connected to the image processing IC 23. The CCDs capture or read an image on an original document to be transmitted to a remote facsimile device. The image processing IC 23 performs processing of an image signal output from the image sensor 21 as will be described in detail later.

The facsimile device further includes a display 11, a RAM (random access memory) 12, a ROM (read only memory) 14, an NCU (network control unit) 15, a keyboard 16, an EEPROM (electrically erasable and programmable read only memory) 17, a modem (modulator/demodulator) 19, and a DMAC (direct memory access controller) 20. The display 11 is formed from an LCD (liquid crystal display) and provided in an operation panel (not shown). The display 11 displays various kinds of information such as time. The RAM 12 temporarily stores various kinds of data. The ROM 14 stores various kinds of programs to be executed by the CPU 13. The keyboard 16 is provided in the operation panel and outputs signals corresponding to keys manipulated by the operator. The EEPROM 17 stores phone number information including abbreviated dialing numbers vis-a-vis parties to be called. The EEPROM 17 also stores particular kinds of flags. The NCU 15 controls the network connected to the telephone line. The modem 19 modulates the outgoing fax signal to be transmitted to a remote facsimile device and demodulates the incoming fax signal from the remote facsimile device. The DMAC 20 directly transfers the data stored In the RAM 12. A main motor 22 and a thermal recording head 24 are connected to the gate array 18. The main motor 22 feeds the original document and a recording medium at a predetermined pitch. The thermal recording head 24 records images transferred from the remote facsimile device on the recording medium.

Figure 2:
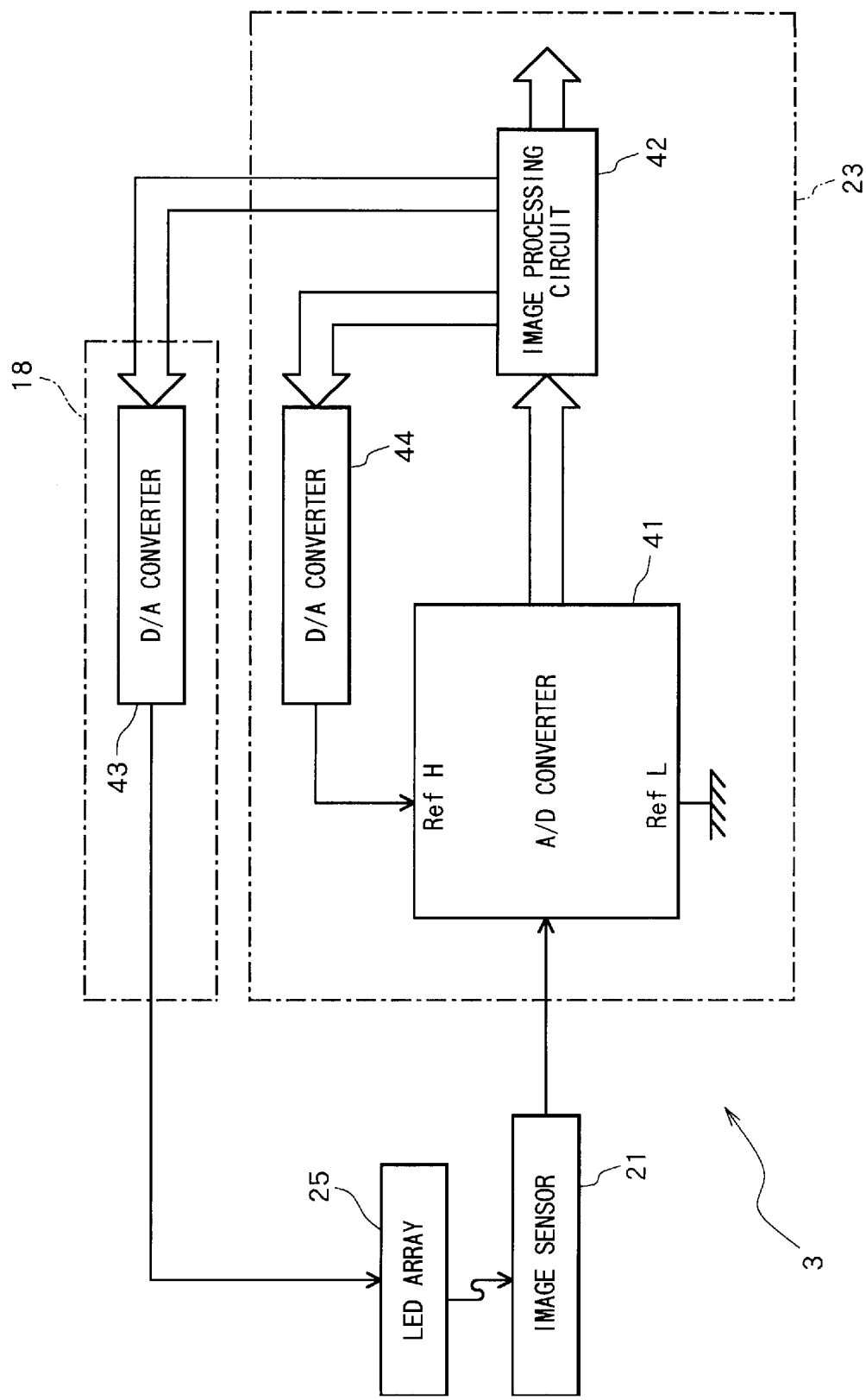
FIG. 2 is a block diagram showing the image reading device according to the first embodiment of the present invention.

FIG. 2 is a block diagram showing the image reading device 3 according to the first embodiment of the present invention. The first embodiment implements adjustment of digitizing conditions in the image reading device 3 so as to reproduce half-tone images with excellent fidelity. The image reading device 3 include the image sensor 21, an analog-to-digital (A/D) converter 41, an image processing circuit 42, digital-to-analog (D/A) converters 43 and 44, and the LED array 25. The output of the image sensor 21 is connected to the input of the A/D converter 41, and the output of the A/D converter 41 is in turn connected to the input of the image processing circuit 42. The image processing circuit 42 has control signal output terminals connected to the inputs of the D/A converters 43 and 44. The output of the D/A converter 43 is connected to the input of the LED array 55, and the output of the D/A converter 44 is connected to the high reference voltage input terminal of the A/D converter 41. The low reference voltage input terminal of the A/D converter 41 is grounded.

The LED array 25 is a light source for the original document. The light emitted from the LED array 25 and reflected from the original document is picked up by the image sensor 21. The image sensor 21 outputs an analog signal having a voltage level which changes depending on the density of a picture element (hereinafter referred to as "pixel"). The A/D converter 41 receives the analog signal from the image sensor 21 and converts it to a corresponding digital signal. The A/D converter 41 digitizes voltage levels falling within a range defined by the low reference voltage and the high reference voltage. The image processing circuit 42 applies first control data to the D/A converter 44, and the D/A converter 44 in turn adjusts the high reference voltage Ref H of the A/D converter 41 in accordance with the output from the D/A converter 44. The image processing circuit 42 also applies second control data obtained to the D/A converter 43, and the D/A converter 43 in turn adjusts the light amount to be emitted from the LED array 25 in accordance with the output from the A/D converter 41.

The A/D converter 41, the image processing circuit 42, and the D/A converter 44 are included in the image processing IC 23, and the D/A converter 43 is included in the gate array 18.

Figure 3:
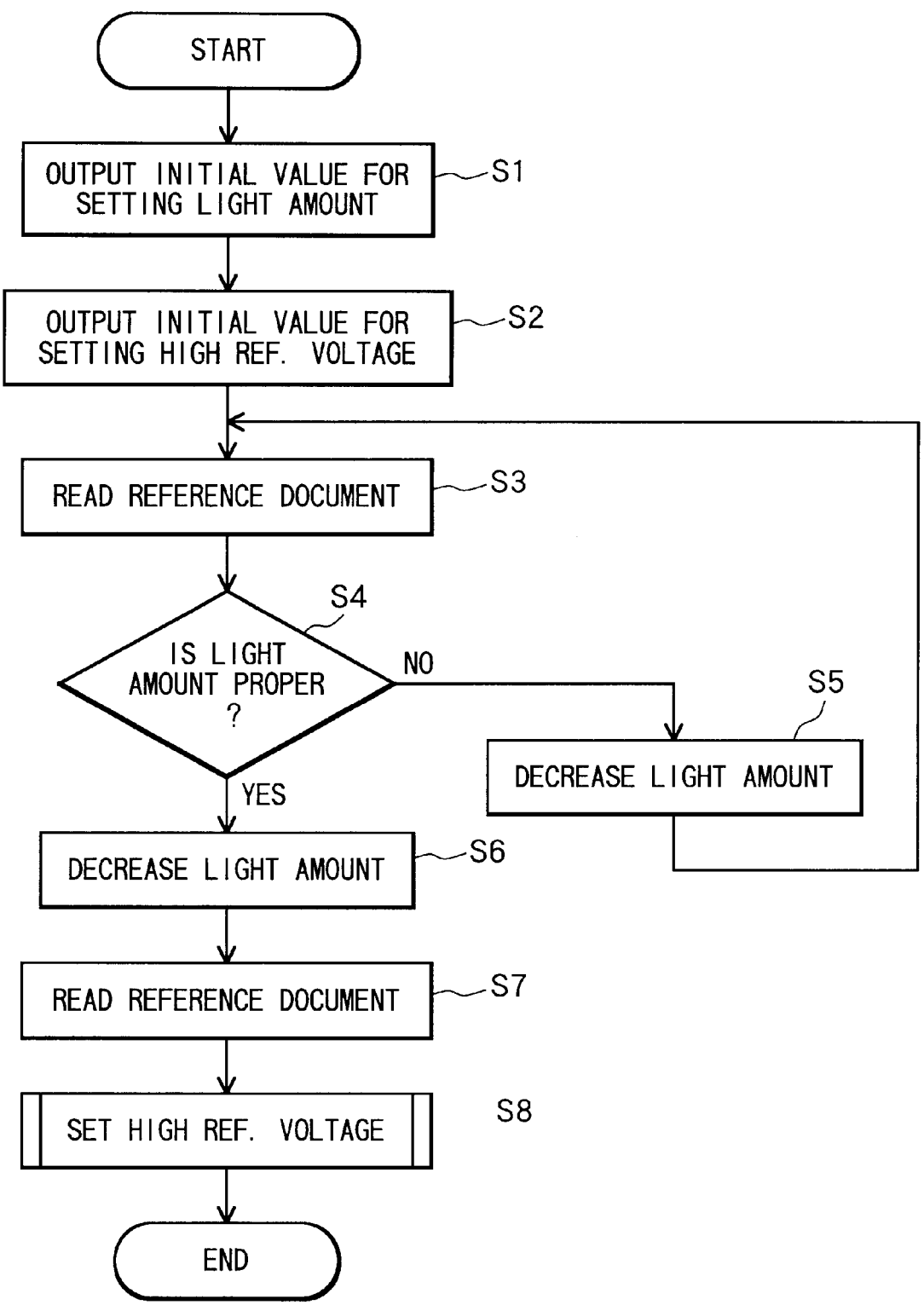
FIG. 3 is a flowchart for illustrating a digitizing condition adjusting sequence according to the first embodiment of the present invention.

Next, while referring to the flowchart of FIG. 3, adjustment of the high reference voltage of the A/D converter 41 will be described. This adjustment is taken place precedent to the transmission of each of the original documents carrying half-tone images. In the following description, Si (i being an integer) indicates the step number.

The image processing circuit 42 outputs predetermined initial data to the D/A converter 43. An example of the predetermined initial data takes a value of "OF" in hexadecimal notation. In response, the D/A converter 43 applies a predetermined voltage to the LED array 25, causing to emit a predetermined light amount therefrom (S1). Then, the image processing circuit 42 outputs another predetermined initial data to the D/A converter 44. This secondly output initial data takes a value of "3F" in the hexadecimal notation, for example. In response, the D/A converter 43 applies a predetermined voltage to the high reference voltage input terminal Ref H of the A/D converter 41 (S2). In this condition, the image sensor 21 reads the surface of a reference document having a predetermined reflection (S3). The image sensor 21 outputs an analog signal corresponding to the light reflected from the surface of the reference document. The analog signal output from the image sensor 21 is converted to a digital signal by the A/D converter 41 and the resultant signal is applied to the image processing circuit 42. Then, the image processing circuit 42 determines whether or not an amount of light emitted from the LED array 25 is proper (S4). In the following description, the expression "proper light amount" will be used to indicate the condition in which the amount of light emitted from the LED array 25 is determined to be proper.

If the amount of light emitted from the LED array 25 is not proper (S4: NO), then the image processing circuit 42 decrements 1 (one) in hexadecimal notation from the initial data sent to the D/A converter 43 so that the light amount emitted from the LED array 55 is decreased (S5), whereupon the routine returns to S3 in which reading of the reference document is again performed. If the amount of light emitted from the LED array 25 becomes proper as a result of decrement of the data value sent to the D/A converter 43 (S4: YES), the image processing circuit 42 further decrements the data value applied to the D/A converter 43 at a predetermined ratio. More specifically, to obtain the finally adjusted data value applied to the D/A converter 43, a coefficient a that is greater than 0 (zero) but smaller than 1 (one) is multiplied to the data value output from the A/D converter 41 when the proper light amount is emitted from the LED array 25. As a result, the light amount set in S6 is smaller than that set in S4 where the proper light amount is emitted from the LED array 25. A difference between the proper light amount and the light amount set in S6 is in proportion to the proper light amount. The image processing circuit 42 outputs the adjusted light amount data to the D/A converter 43 so that the light amount emitted from the LED array 25 is in coincidence with the light amount set in S6. In the following description, the light amount set in S6 will be referred to as "set light amount". The adjusted light amount data is subjected to digital-to-analog conversion in the D/A converter 43 and the resultant analog signal is applied to the LED array 25. The LED array 25 emits the set light amount that is smaller than the proper light amount.

Figure 4:
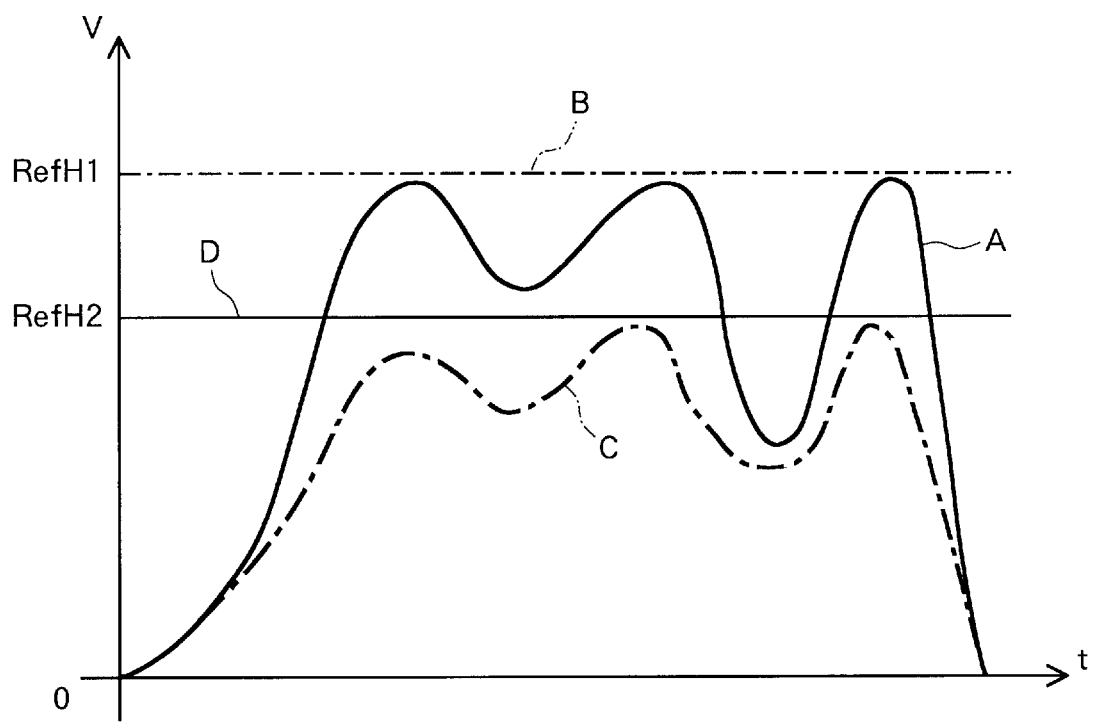
FIG. 4 is a waveform diagram for illustrating an analog image signal input to an AID converter vis-a-vis high reference voltages used in the AID converter to digitize the image signal.

In this condition, the image sensor 21 captures light reflected from the surface of the reference document (S7). The image sensor 21 outputs an analog signal corresponding to the light amount received from the reference document. The analog signal output from the image sensor 21 is converted to a digital signal by the A/D converter 41 and the resultant signal is applied to the image processing circuit 42. The image processing circuit 42 outputs updated data value to the D/A converter 44 for setting the high reference voltage of the A/D converter 41 (S8), whereupon the routine is ended. The procedure as to how the high reference voltage of the A/D converter 41 is to be set is well known in the art, so further description thereof is omitted herein. It is to be noted that the high reference voltage of the A/D converter 41 is set somewhat low because the high reference voltage thereof is determined based on the set light amount that is smaller than the proper light amount. More specifically, when the proper light amount is emitted from the LED array 25, the output from the image sensor 21, or the input of the A/D converter 41, is at a high level as indicated by a solid-line A in FIG. 4. Then, the high reference voltage of the A/D converter 41 is determined to be at a high level Ref H1 as indicated by one-dotted-chain line in FIG. 4. However, in the present embodiment, the high reference voltage of the A/D converter 41 is determined based on the light amount smaller than the proper light amount, so that the high reference voltage of the A/D converter 41 is set to a value Ref H2 low than Ref H1, as indicated by a solid line D in FIG. 4. The proper light amount is reduced at a predetermined ratio to give the set light amount. Therefore, the output from the image sensor 21, that is, the input of the A/D converter 41 is also lowed at the same ratio, as shown by one-dotted-chain line C in FIG. 4. The high reference voltage Ref H2 of the A/D converter 41 indicated by the solid line D is also a reduction of the high reference voltage Ref H1 indicated by one-dotted-chain line B at the same ratio.

After the high reference voltage adjusting process is over, a half-tone image on the original document is read. The image processing circuit 42 outputs the light amount data corresponding to the proper light amount set in S4 to the D/A converter 43. Also, the image processing circuit 42 outputs high reference voltage data corresponding to the high reference voltage determined in S8. As a result, the output from the image sensor 21, that is, the input of the A/D converter 41 is such a waveform as shown by a solid line A in FIG. 4. The high reference voltage of the A/D converter 41 is Ref H2 as shown by the solid line D in FIG. 4. In this way, the high reference voltage is set lower relative to the image signal. This increases the gradation and thus half-tone images are reproduced with excellent fidelity.

As described above, the image processing circuit 42 decreases the amount of light emitted from the LED array 25 at the predetermined ratio to adjust the high reference voltage, therefore, the voltage level of the analog signal output from the image sensor 21 decreases and so the input and output of the A/D converter 41 also decrease. In this condition, the high reference voltage of the A/D converter 41 is adjusted. The adjusted high reference voltage is suitable for the A/D converter 41 to reproduce the half-tone images. Accordingly, this embodiment can adjust the digitizing condition of the image reading device so as to be suitable for reproducing the half-tone images only by adjusting the light amount to be emitted from the LED array 25. A voltage division circuit as is required in the prior art devices does not need to be provided. Therefore, the manufacturing cost can be reduced.

Figure 5:
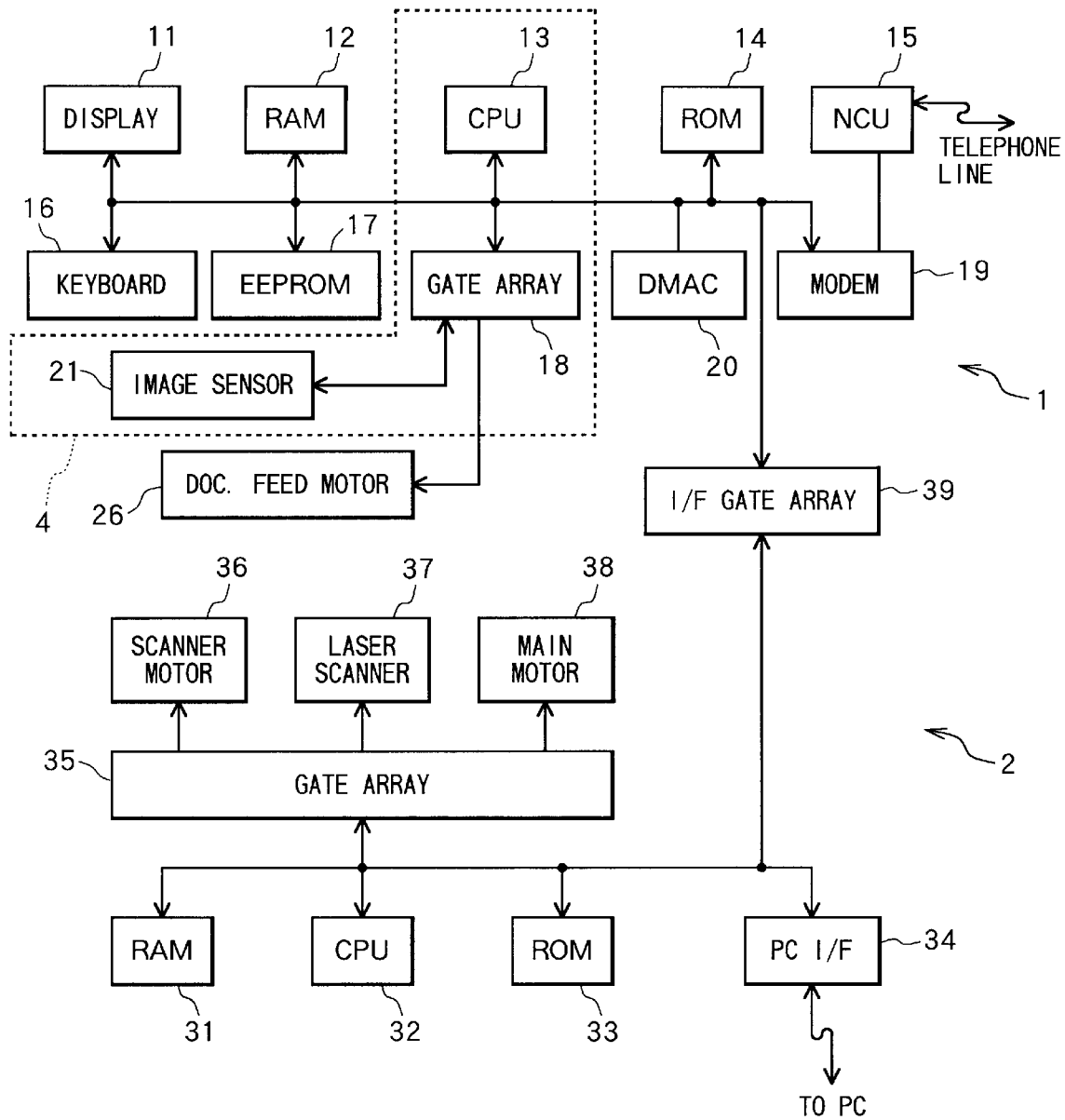
FIG. 5 is a block diagram showing a facsimile device incorporating the image reading device according to a second embodiment of the present invention.

A second embodiment of the present invention will be described while referring to FIGS. 5 through 9. FIG. 5 shows the facsimile device incorporating the image reading device 4 of the second embodiment. The arrangement of the facsimile device is similar to that of the first embodiment shown in FIG. 1. The common components in FIGS. 1 and 5 are designated with the same reference numerals, and duplicate description thereof is omitted. The arrangement of the facsimile device shown in FIG. 5 differs from that of the facsimile device shown in FIG. 1 in that a laser printer is used in the printer section 2. Further, in the second embodiment, the image sensor 21 and a document feed motor 26 are connected to the gate array 18. The image reading device 4 of the second embodiment is constituted by the image sensor 21, the gate array 18, and the CPU 13.

The printer section 2 includes a RAM 31, a CPU 32, a ROM 33, a PC Interface (I/F) 34, and a gate array 35. The RAM 31 stores various data processed or to be processed by the CPU 32. The CPU 32 controls the overall operations in the printer section 2. The ROM 33 stores various programs to be executed by the CPU 32 and also stores character patterns. The PC I/F 34 is provided for connection of the facsimile device to a personal computer (not shown). To the gate array 35 are connected a scanner motor 36, a laser scanner 37, and a main motor 38. The laser scanner 37 is driven by the scanner motor 26 and scans a laser beam to form an image to be recorded. The main motor 38 is a drive source for the mechanisms of a paper transportation and toner agitation. The facsimile section 1 and the printer section 2 are connected by an I/F gate array 41.

Figure 6:
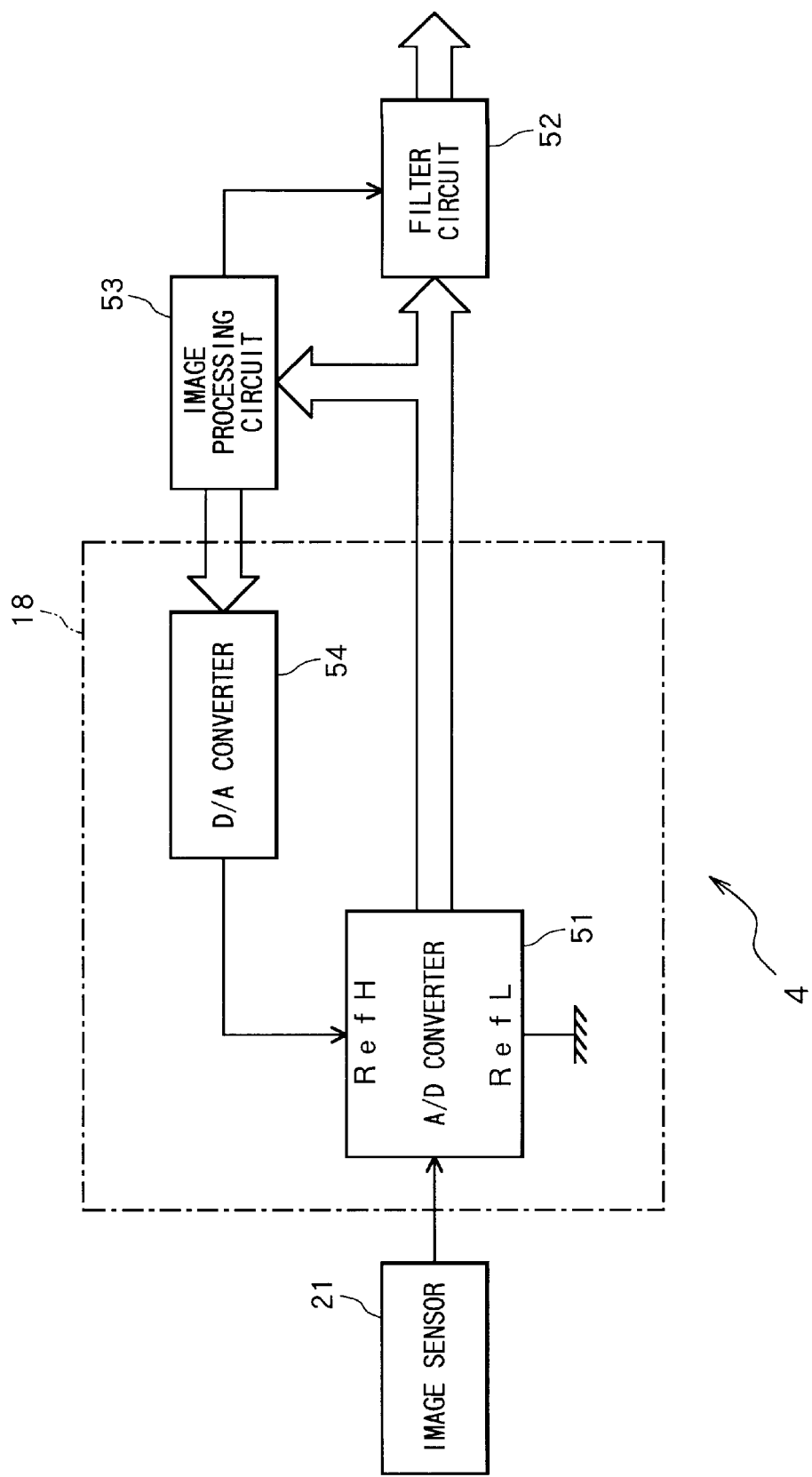
FIG. 6 is a block diagram showing the image reading device according to the second embodiment of the present invention.

FIG. 6 shows the image reading device 4 according to the second embodiment of the present invention. The image reading device 4 includes an image sensor 21, an A/D converter 51, a filter circuit 52, an image processing circuit 53, and a D/A converter 54. The output of the image sensor 21 is connected to the input of the A/D converter 51, and the output of the A/D converter 51 is in turn connected to the inputs of the filter circuit 52 and the image processing circuit 53. The output terminal of the image processing circuit 53 is connected to the input of the D/A converter 54, and the output of the D/A converter 54 is connected to the high reference voltage input terminal Ref H of the A/D converter 51. The low reference voltage input terminal Ref L of the A/D converter 51 is grounded. The control signal output terminal of the image processing circuit 53 is connected to the control signal input terminal of the filter circuit 52.

The image sensor 21 reads the image on the original document and outputs an analog signal corresponding to a density level of the image. The image sensor 21 outputs about 0 volt for the black image on the original document and a positive voltage for the white image thereon. The A/D converter 51 receives the analog signal output from the image sensor 21 and converts it to a corresponding digital signal. An analog signal having a higher positive voltage level is converted to a digital signal having a large value. Therefore, a larger digital value is output from the A/D converter 51 for the image that is closer to the white level. The filter circuit 52 changes the data of each pixel depending on the data of the adjacent pixels surrounding the pixel in question. The filter circuit 52 emphasizes the density of the pixel in question relative to the densities of the surrounding pixels. The image processing circuit 53 is implemented by the CPU 13 provided in the facsimile section 1. The image processing circuit 53 also controls the filter circuit 52 to set a small emphasizing degree with respect to the original document having a high density background.

Figures 7, 8:
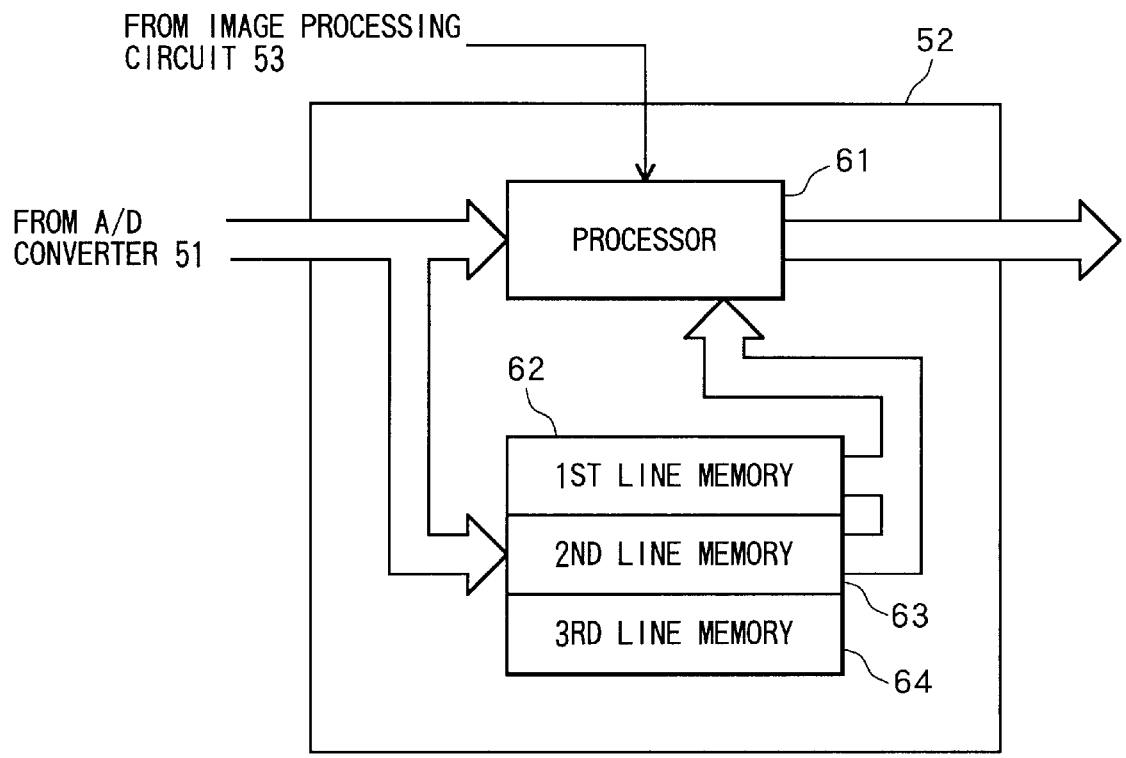
FIG. 7 is a block diagram showing a filter circuit provided in the image reading device of the second embodiment.
FIG. 8 is an explanatory diagram showing positional relations between a picture element in question and its adjacent picture elements.

FIG. 7 shows a filter circuit 52. As shown, the filter circuit 52 includes a processor 61, and first, second and third line memories 62, 63 and 64. A predetermined storage region of the RAM 12 serves as the first to third line memories 62 through 64.

The filter circuit 52 converts data e of the pixel in question fed from the A/D converter 51 to data E in accordance with the following equation.

$$E = e + K \{e - (a+b+c+d+e+f+g+h+i)/8\}$$

where K is 0 or an integer equal to or greater than 1 (one).

Referring to FIG. 8, it is now assumed that e is the data of pixel in question. Then, a, b and c designate data of adjacent pixels in the preceding line. The pixel having data b is located in the same row of the preceding line with respect to the locatio of the pixel in question. The pixels having data a and c are the pixels adjacent to the pixel having data b on the same line. The pixels having data d and f are the pixels located at immediate left and right rows on the same line with respect to the pixel in question. The pixel having data h is located in the same row of the subsequent line with respect to the location of the pixel in question. The pixels having data g and i are the pixels adjacent to the pixel having data h on the same line. The above equation gives data E for the pixel in question having data e. According to the equation, an average data of the data of the adjacent pixels having data a to d and f to i is subtracted from data a of the pixel in question, a filter emphasis coefficient K is multiplied to the resultant subtracted value, and the data e is added to the resultant multiplied value. The larger the difference between the data of pixel in question and the average data of the adjacent pixels, the larger the difference between the unprocessed data e and the processed data E of the pixel in question. This tendency is augmented if a large filter emphasizing coefficient is adopted. The filter emphasizing coefficient takes a value of 0 (zero) or an integer equal to or greater than 1 (one). The filter emphasizing coefficient is determined based on the control signal input to the processor 61 from the image processing circuit 53. Specifically, the filter circuit 52 converts the data of pixel having a density higher than the average density to data having much higher density. On the other hand, the filter circuit 52 converts the data of pixel having a density lower than the average density to data having much lower density. That is, the whitish pixel is converted to a pixel whose white content is increased. The blackish pixel is converted to a pixel whose black content is increased. For example, if the pixel in question is at the black level, the value of the second term at the right side of the above equation becomes a negative value because the value e is small, so that the resultant value E is smaller than the original value e. This means increasing the black level of the pixel in question. Conversely, if the pixel in question is at the white level, the value of the second term at the right side of the above equation becomes a positive value, so that the resultant value E is larger than the original value e. This means increasing the white level of the pixel in question. As described, the emphasizing degree is determined by the filter emphasizing coefficient and the difference between the density of the pixel in question and the average density of the adjacent pixels.

Next, the operation of the filter circuit 52 will be described.

The digital data output from the A/D converter 51 represents the density of each pixel and three lines worth of the digital data are temporarily stored in the first to third line memories 62 through 64. That is, the data on the line that is two lines precedent to the current line is stored in the first line memory 62. The data on the immediate precedent line with respect to the current line is stored in the second line memory 63. The data on the current line that is currently read by the image sensor 21 is sequentially stored in the third line memory 64. To perform the filter processing for the pixel having data e, the processor 61 retrieves the data a, b and c of the adjacent pixels from the first line memory 62, and data d, e and f from the second line memory 63. The data g, h and i of the pixels on the current line is stored in the third line memory 64 and simultaneously stored in a register (not shown) provided in the processor 61. The register is formed from latch circuits and is capable of storing three worth of pixel data. The processor 61 retrieves data g, h and i from the register, and computes data E using the above equation. The computed result is output from the filter circuit 52. At this time, the filter emphasizing coefficient K is determined depending on the control signal fed from the image processing circuit 53. The determination of the coefficient K will be described later.

Each time when new data is stored in the register of the processor 61 and also in the third line memory 63, the processor 61 processes the data of the pixel in question stored in the second line memory 63 and the resultant processed data is sequentially output from the filter circuit 52. When the data of the pixel located at the final column of the current line is stored in the corresponding storage location of the third line memory 64, then the data of the pixel located in the final column of the immediate preceding line is processed, whereupon the data in the second line memory 63 is transferred to the first line memory 62, and the data in the third line memory 64 to the second line memory 63. After completion of the data transfer, the filtering process for the next line is implemented. The data stored in the register of the processor 61 is shifted and updated each time filtering process for one pixel data is complete.

Figure 9:
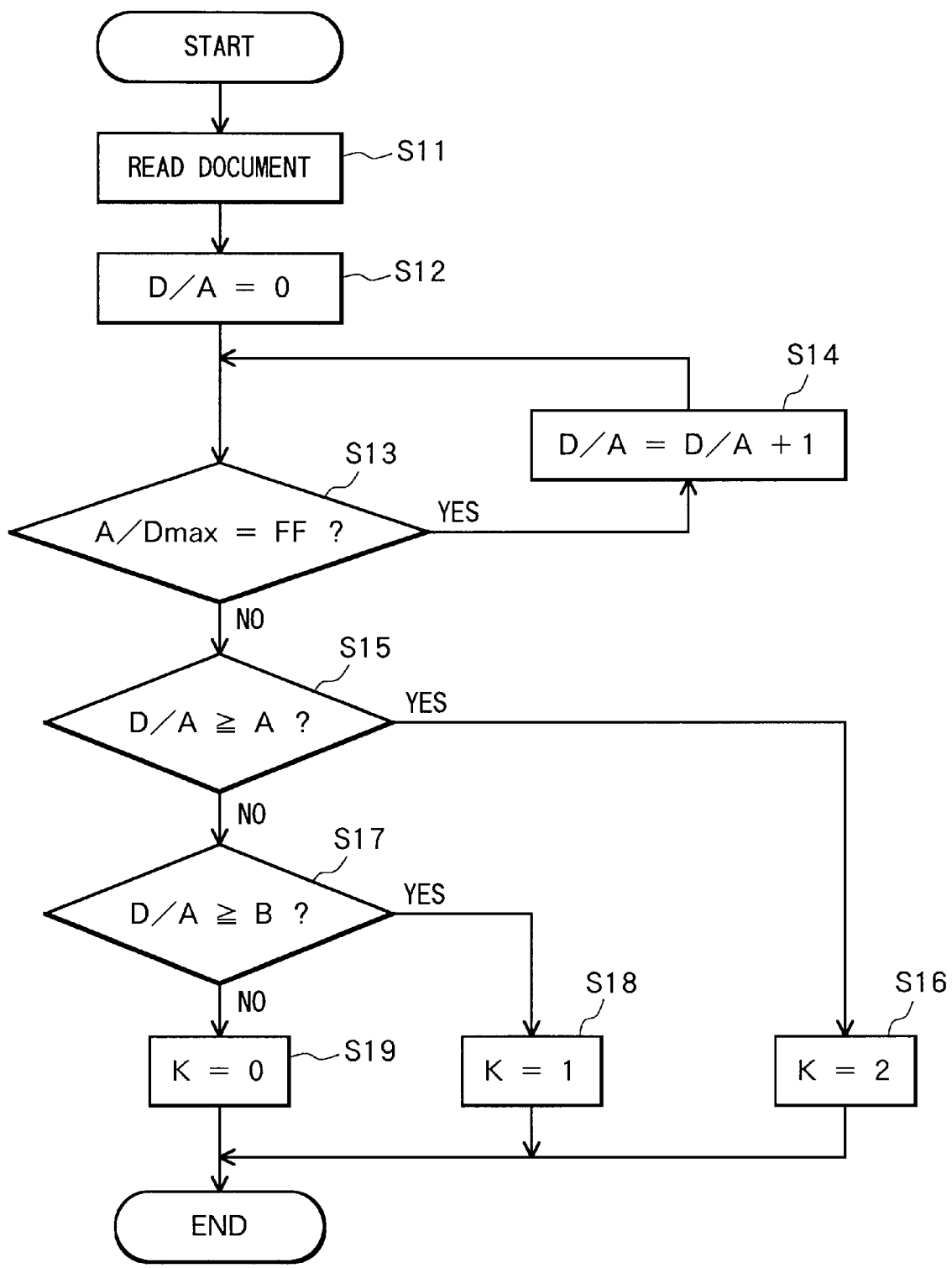
FIG. 9 is a flowchart for illustrating a digitizing condition adjusting sequence according to the second embodiment of the present invention.

Next, operation of the second embodiment will be described while referring to the flowchart shown in FIG. 9.

First, the CPU 13 controls the image sensor 21 to consecutively read the image on the same line at the top edge of the original document while keeping the original document stationary (S11). Then, the CPU 13 sends zero input to the D/A converter 54 so that a high reference voltage Ref H with a minimum value is output to the high reference voltage input terminal of the A/D converter 51 (S12). The A/D converter 51 performs A/D conversion of the image signal read by the image sensor 21, and the CPU 13 determines whether or not the maximum level of the image signal input to the A/D converter 51 exceeds the high reference voltage Ref H. That is, determination is made as to whether or not the maximum value of the output from the A/D converter 51 has reached the upper limit value (S13). The upper limit value is FF in hexadecimal notation in the case where the analog signal is digitized by dividing the voltage range from the low reference voltage Ref L to the high reference voltage Ref H with FF in hexadecimal notation. If the maximum value of the output from the A/D converter 51 has reached the upper limit value (S13: YES), the input of the D/A converter 54 is incremented by 1 (one) because the upper reference voltage Ref H is set too low. The incremented data input to the D/A converter 54 increases the high reference voltage Ref H output to the high reference voltage terminal of the A/D converter 51 by a predetermined level (S14), whereupon the routine returns to S13.

The procedures in S13 and S14 will be repeatedly executed to increase the high reference voltage Ref H in succession until the maximum value of the input to the A/D converter 51 becomes lower than the updated high reference voltage Ref H (S13: NO) or until the maximum output of the A/D converter 51 falls below the upper limit value FF. When it is determined that the maximum output of the A/D converter 51 falls below the upper limit value (S13: NO), it is further determined that the input to the D/A converter 54 is above a predetermined value A (S15). The affirmative decision (S15: YES) indicates that the maximum output from the A/D converter 51 is large. This means that the background density of the original document is low. That is, the background of the original document is whitish rather than blackish. In this case, the image processing circuit 53 outputs a control signal to the processor 61 of the filter circuit 52 to set the filter enhancement coefficient K to 2 (two) (S16), whereupon the routine is ended.

When the input of the D/A converter 54 does not exceed the predetermined value A (S15: NO), then it is determined whether or not the input of the D/a converter 54 is above a predetermined value B (S17). The predetermined value B is smaller than the predetermined value A. If the input of the D/A converter 54 is above the predetermined value B (S17: YES), it is suggested that the maximum output from the A/D converter 51 is about middle. This means that the background density of the original document is slightly high. In this case, the image processing circuit 53 outputs a control signal to the processor 61 of the filter circuit 52 to set the filter enhancement coefficient K to 1 (one) (S18), whereupon the routine is ended.

If the input to the D/A converter 54 is not above the predetermined value B (S17: NO), it is suggested that the maximum output from the A/D converter 51 is low. This means that the back ground density of the original document is high. Accordingly, the image processing circuit 53 outputs a control signal to the processor 61 of the filter circuit 52 to set the filter enhancement coefficient K to 0 (zero) (S19) so as not to perform the enhancement process to the image, whereupon the routine is ended.

As described above, the image processing circuit 53 outputs control signals to the filter circuit 52 to change the filter enhancement coefficient K based on the high reference voltage of the A/D converter 51 that is equivalent to the output from the image processing circuit 53. Because the filter enhancement coefficient K is set to a small value with respect to the original document with a high background density, the noise components will not be enhanced too much. Accordingly, the images on a high density background original can also be reproduced with a high fidelity.

The illustrated embodiment adjusts the filter enhancement coefficient K in three steps from 0 to 2. However, the adjusting steps can be arbitrarily selected depending on the circuit design or the like. Further, although in the flowchart shown in FIG. 9, the output level of the A/D converter 54 is successively increased starting from the minimum value to detect the background density condition of the original document, the output level of the A/D converter 54 may be successively decreased from the maximum value. Detection of the background density condition of the original document can be achieved in a different way. For example, the peak value of the digital signal obtained from the A/D converter 51 having fixed high and low reference voltages can be used as the background density data. The filter enhancement coefficient K will be controlled depending on the thus obtained background density data.

Finally, a third embodiment of the present invention will be described while referring to FIGS. 10 through 14.

Figure 10:
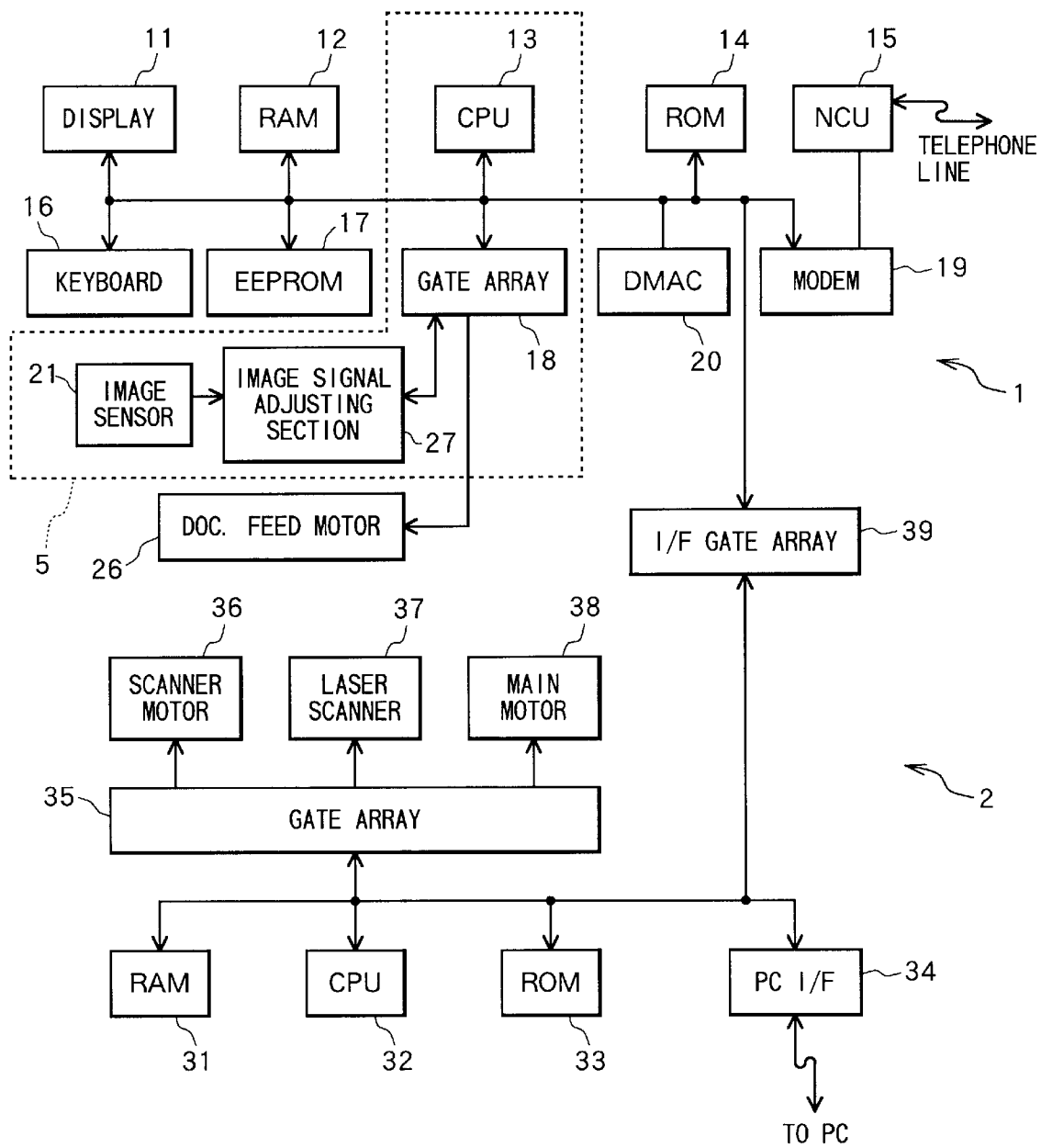
FIG. 10 is a block diagram showing a facsimile device incorporating the image reading device according to a third embodiment of the present invention.

FIG. 10 shows the facsimile device incorporating the image reading device 5 of the third embodiment. The arrangement of the facsimile device is similar to that of the second embodiment shown in FIG. 5. The common components in FIGS. 1, 5 and 10 are designated with the same reference numerals, and duplicate description thereof is omitted. The arrangement of the facsimile device shown in FIG. 10 differs from that of the facsimile device shown in FIG. 5 in that the image sensor 21 is connected to the gate array 18 via an image signal adjusting section 27.

Figure 11:
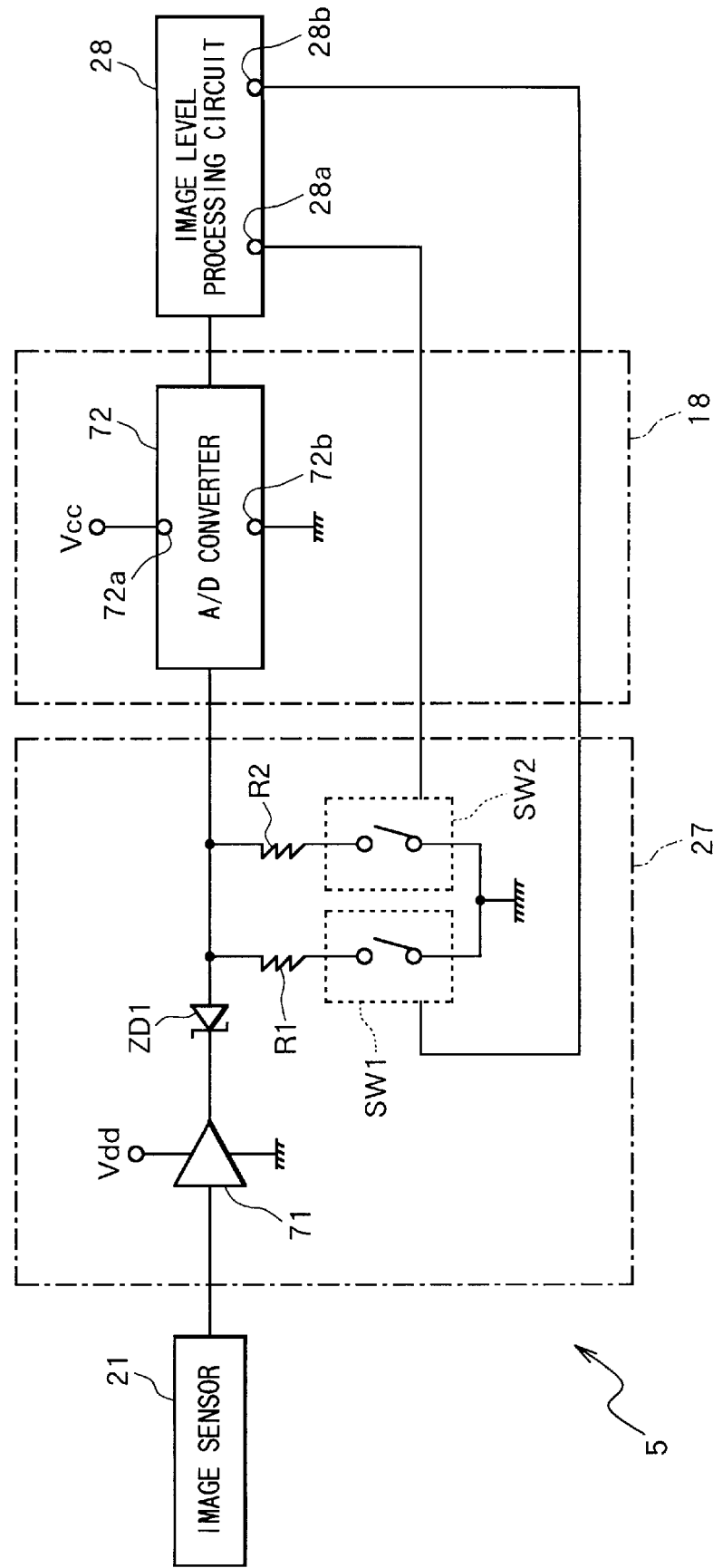
FIG. 11 is a block diagram showing the image reading device according to the third embodiment of the present invention.

FIG. 11 shows an image reading device according to the third embodiment of the present invention. The device includes the image sensor 21, the image signal adjusting section 27, an A/D converter 72, and an image processing circuit 28. The input of the image signal adjusting section 27 is connected to the output of the image sensor 21. The image signal adjusting section 27 includes an amplifier 71, a Zenor diode ZD1, resistors R1 and R2, and switches SW1 and SW2. The amplifier 71 is provided with a power source input terminal supplied with a predetermined voltage Vdd from a power source, and another power source input terminal connected to ground. The input of the amplifier 71 is connected to the output of the image sensor 21. The output of the amplifier 71 is connected to the cathode of the Zenor diode ZD1. The anode of the Zenor diode ZD1 is connected to the input of the A/D converter 72. A series connection of the resistor R1 and the switch SW1 is connected between the anode of the Zenor diode ZD1 and ground. Another series connection of the resistor R2 and the switch SW2 is also connected therebetween so that the two series connections are in parallel with each other between the anode of the Zenor diode ZD1 and ground. The switches SW1 and SW2 have control signal input terminals connected to control signal output terminals 28b and 28a of the image processing circuit 28, respectively, to receive black level adjusting control signals therefrom. Resistance value of the resistor R1 is larger than that of the resistor R2. The A/D converter 72 is a part of the gate array 18. The A/D converter 72 has a high reference voltage input terminal 72a applied with a voltage Vcc and a low reference voltage input terminal 72b connected to ground. A voltage Vcc lower than the power source voltage Vdd is applied to the high reference voltage input terminal 72a of the A/D converter 72. The output of the A/D converter 72 is connected to the image processing circuit 28.

Figure 12:
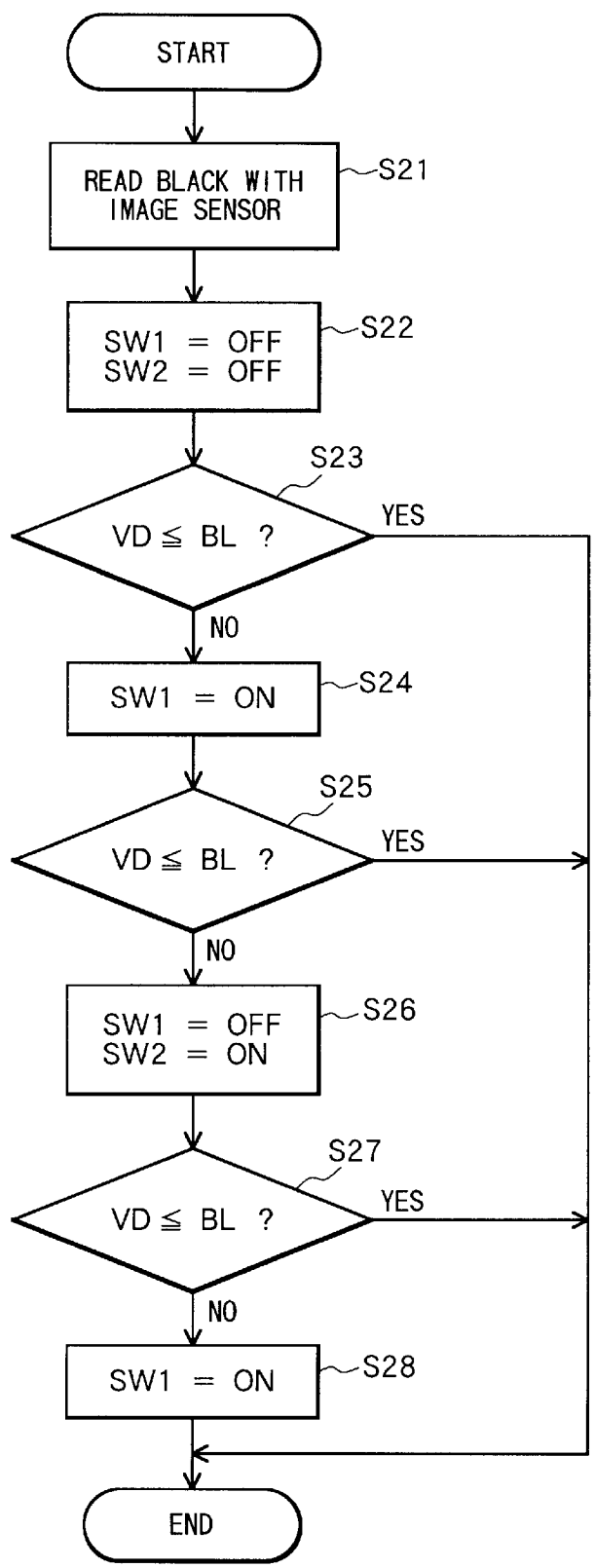
FIG. 12 is a flowchart for illustrating a digitizing condition adjusting sequence according to the second embodiment of the present invention.
Figure 13:
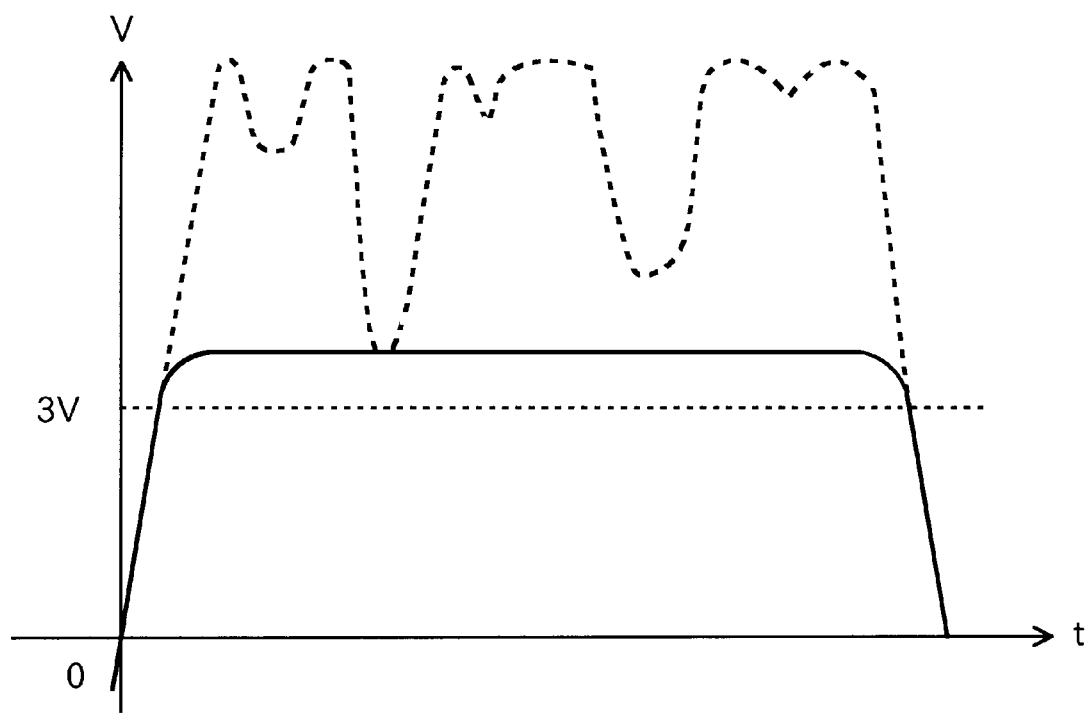
FIG. 13 is a waveform diagram for illustrating an analog image signal output from an image sensor according to the third embodiment of the present invention.

Operation of the image reading device thus arranged will be described with reference to the flowchart shown in FIG. 12.

To perform a black level adjustment, the LED array is turned off, and in this condition the image sensor 21 performs a reading operation (S21). The image sensor 21 outputs an analog signal having a voltage level corresponding to a black image. The analog signal is amplified by the amplifier 71. The amplifier 71 outputs an amplified analog signal such as shown by a solid line in FIG. 13. When images with different density levels are read by the image sensor 21, the amplified analog signal obtained from the amplifier 71 will take a waveform shown by a dotted line in FIG. 13. That is, the voltage level of the amplified analog signal changes depending on the density of the pixel read by the image sensor 21. However, the output of the image sensor 21 obtained when the LED array is turned off is at a minimum constant voltage level. In this condition, the output voltage from the image sensor 21 is at the lowest level. The output voltage of the image sensor 21 is amplified by the amplifier 71 to output 3 volts d.c. component superimposed voltage on the output voltage of the image sensor 21. The d.c. component of the output from the amplifier 71 is cut by the Zenor diode ZD1 to drop the voltage level by the Zenor voltage. The resultant signal is applied to the A/D converter 72 for analog-to-digital conversion. The digital signal from the A/D converter 71 is applied to the image processing circuit 28 where the digital signal is converted to image data upon effecting a predetermined processing to the input digital signal.

To the high reference voltage input terminal Ref H of the A/D converter 72 is applied, for example, 5 volts. The low reference input terminal is connected to ground. Therefore, the voltage range from 0 to 5 volts are divided into 64 sub-ranges and the analog signal having a voltage level falling within any one of the 64 sub-ranges is converted to the corresponding digital signal. As such, if a relatively high voltage is input to the A/D converter 72 when a black image is read, the input voltage applied to the A/D converter 72 when a white image is read will be increased corresponding to the increased level of the voltage input to the A/D converter when the black image is read. In such a situation, the input voltage to the A/D converter 72 when the white image is read will exceed 5 volts. If the analog-to-digital conversion is carried out in such a condition, the images having densities from a black level to a white level are not correctly divided into 64 levels, so that an S/N ratio is degraded. The Zenor diode ZD1 is provided for cutting the d.c. component contained in the output of the amplifier 71 by the Zenor voltage. However, there may be cases where the cut level is insufficient due to variation in the Zenor voltage.

The image processing circuit 28 renders both the switches SW1 and SW2 OFF (S22), whereupon determination is made as to whether or not the output from the A/D converter 72, i.e., the input voltage VD to the image processing circuit 28, is equal to or below a predetermined voltage BL (S23). It is to be noted that the output signal from the A/D converter 72 is equivalent to the input signal to the A/D converter 72 although the former signal is in the form of a digital signal and the latter signal is in the form of an analog signal. If the voltage VD is equal to or below the predetermined voltage BL (S3: YES), the routine is ended because this condition suggests that the d.c. component is properly cut by the Zenor diode. There is no need to change the Zenor voltage.

If the input voltage VD to the image processing circuit 28 is not below the predetermined voltage BL (S23: NO), the image processing circuit 28 renders the switch SW1 ON (S24), whereupon determination is made as to whether or not the input voltage VD to the image processing circuit 28 is equal to or below the predetermined voltage BL (S25). If the voltage VD is equal to or below the voltage BL (S25: YES), this routine is ended. When the switch SW1 is ON, a current flowing in the Zenor diode ZD1 increases by a current flowing in the resistor R1 so that the Zenor voltage is correspondingly increased. The d.c. component contained in the output of the amplifier 71 is cut by the increased Zenor voltage. Because the voltage VD is below the voltage BL in such a condition, the adjustment of the black level is complete.

If the input voltage to the image processing circuit 28 is not below the predetermined voltage BL (S25: NO), the image processing circuit 28 renders the switch SW1 OFF and the switch SW2 ON (S26), whereupon determination is made as to whether or not the input voltage VD to the image processing circuit 28 is below the predetermined voltage BL (S27). If affirmative (S27: YES), the routine is ended. Because the resistance of the resistor R2 is smaller than that of the resistor R1, the current flowing in the Zenor diode ZD1 further increases to cause the Zenor voltage to be further increased. Therefore, the cutting level of the d.c. component contained in the output of the amplifier 71 further increases. Because the voltage VD is below the voltage BL in this condition, the adjustment of the black level is complete.

If the input voltage VD to the image processing circuit 28 is not below the predetermined voltage BL (S27: NO), the image processing circuit 28 renders the switch SW1 ON (S28), whereupon this routine is ended. The composite resistance of the parallel-connected resistors R1 and R2 is smaller than the resistance value of the resistor R2. Therefore, the current flowing in the Zenor diode ZD1 increases much further to cause the Zenor voltage to be much more increased, causing to further increase the cutting level of the d.c. component, whereupon the adjusting procedure for adjusting the black level is terminated without confirming that the voltage VD is below the predetermined voltage BL in this condition. This is because no further adjustment cannot be performed even if the voltage VD is not below the voltage BL.

The above-described adjusting procedure is carried out precedent to an image reading operation that is necessary when facsimile transmission is to be performed or a copy of the original document is to be made using a copying function of the facsimile device. When plural sheets of documents are to be read, the black level adjusting procedure is taken place before reading the first page of the documents. Therefore, the black level adjustment covers the variation in the Zenor voltage resulting from the change of environmental temperature and also the variations of the elements constituting the image reading device 5. The black level adjustment may be performed with respect to each page of the documents, however, one adjustment performed before reading the first page would suffice because environmental temperature will not change abruptly within a few minutes necessitated for reading all the pages of the documents. Shortening the time required for reading the entire documents would be more important.

Figure 14:
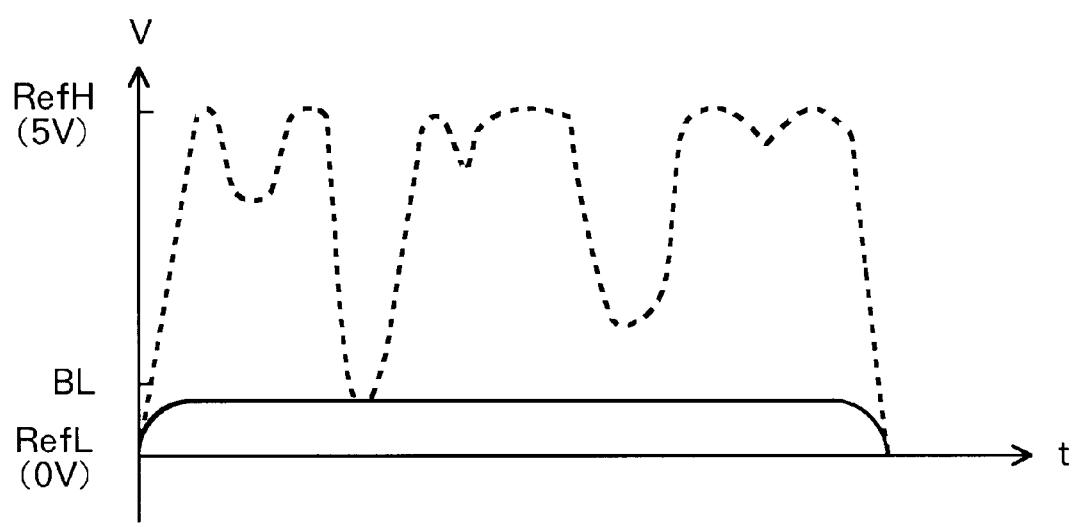
FIG. 14 is a waveform diagram for illustrating an analog image signal applied to the input of an A/D converter according to the third embodiment of the present invention.

When the black level adjustment is performed in accordance with the procedure described above, the input voltage applied to the A/V converter 72 is below the predetermined voltage BL as indicated by a solid line in FIG. 14. Therefore, even if the low reference voltage of the A/D converter 72 is zero volt, the A/D converter 72 can convert the input analog signal to a digital signal with an excellent S/N ratio.

Because the black level adjustment can be implemented with the use of resistors R1, R2 and switches S1, S2, there is no need to use expensive D/A converters of low output impedance. Accordingly, cost of the black level adjusting circuit can be reduced and so the manufacturing cost can be reduced.

Although in the above-described embodiment, two switches SW1, SW2 are provided externally of the image processing circuit 28, these switches can be dispensed with if ground side terminals of the resistors R1 and R2 are connected to the control signal output terminals 28a and 28b of the image processing circuit 18 provided that open-drain terminals of the image processing circuit 28 are used as the control signal output terminals 28a and 28b. In this case, the open-drain terminals serve as switches. Currents are flowed into the open-drain terminals through the resistors R1 and R2 when the open-drain terminals are at a low level.

Although two resistors R1 and R2 are provided in the case of the above-described embodiment, the resistor number and resistance value of each resistor can be arbitrarily determined depending on an adjusting range of the black level and the required accuracy. The use of more than two resistors having the same resistance is acceptable. However, the use of resistors having different resistances is advisable in terms of increasing the number of combinations of the resistors and also increasing adjusting accuracy. The black level adjustment may be performed at the time of shipment of the devices where there is no substantial change of environmental temperature.

While exemplary embodiments of this invention has been described in detail, those skilled in the art will recognize that there are many possible modifications and variations which may be made in these exemplary embodiments while yet retaining many of the novel features and advantages of the invention. For example, the image reading device may be constructed to include at least two embodiments described above.

What is claimed is:

1. An image reading device comprising:
    a light source for emitting light toward a surface of a sheet member having a density and carrying an image thereon, the image having a density level falling within a range from a black level to a white level;
    image reading means for receiving light reflected from the surface of the sheet member and outputting an analog signal corresponding to the image, the analog signal having a voltage level determined depending on the density level of the image and an amount of light emitted from said light source;
    an A/D converter having a first input terminal to which a low reference voltage is applied and a second input terminal to which a high reference voltage is applied, said A/D converter converting the analog signal output from said image reading means to a digital signal, the analog signal having an analog voltage ranging from the low reference voltage to the high reference voltage;
    initial digitizing condition setting means for setting an initial digitizing condition;
    determination means for determining whether or not the initial digitizing condition meets a criteria, said determination means outputting a reference digital signal when said determination means determines that the initial digitizing condition does not meet the criteria; and
    digitizing condition adjusting means for adjusting the initial digitizing condition based on the reference digital signal so as to set an adjusted digitizing condition which meets the criteria,
    whereby when the initial digitizing condition meets the criteria, the analog signal output from said image reading means is digitized in accordance with the initial digitizing condition, and when the initial digitizing condition does not meet the criteria, the analog signal is digitized in accordance with the adjusted digitizing condition.

2. An image reading device according to claim 1, wherein said initial digitizing condition setting means sets a level of the high reference voltage applied to the second input terminal of said A/D converter and the amount of light to be emitted from said light source as the initial digitizing condition, and wherein said initial digitizing condition setting means applies a predetermined high reference voltage to the second input terminal of said A/D converter and determines the amount of light to be emitted from said light source while referring to the digital signal output from said A/D converter when said image reading means receives light reflected from a reference sheet member having a predetermined reflection factor.

3. An image reading device according to claim 2, wherein said digitizing condition adjusting means adjusts the high reference voltage applied to the second input terminal of said A/D converter.

4. An image reading device according to claim 1, wherein said initial digitizing condition setting means sets, as the initial digitizing condition, a voltage level of an analog signal corresponding to a black image having only a black level before the analog signal corresponding to the black image is applied to said A/D converter.

5. An image reading device according to claim 4, wherein said digitizing condition adjusting means comprises:
    an amplifier connected to said image reading means, for amplifying the analog signal received from said image reading means and for outputting an amplified analog signal having an amplified voltage level;
    voltage dropping means connected to said amplifier for dropping the amplified voltage level of the amplified analog signal; and
    resistor means connected between said voltage dropping means and said A/D converter, for outputting selective one of a plurality of resistance values, wherein said voltage dropping means drops the amplified voltage level according to the selective one of the plurality of resistance values, and the selective one of the plurality of resistance values is selected so that the amplified plurality of resistance values is selected so that the amplified voltage level dropped by said dropping means meets the criteria.

6. An image reading device comprising:
    image reading means for reading an image having a density level falling within a range from a black level to a white level and outputting an analog signal corresponding to the image, the analog signal having a voltage level determined depending on the density level of the image;
    level adjusting means connected to said image reading means, for adjusting the voltage level of the analog signal in accordance with an adjusting coefficient and for outputting a level adjusted analog signal;
    an A/D converter connected to said level adjusting means, for converting the level adjusted analog signal having an adjusted voltage level falling within a range from a first reference voltage to a second reference voltage to a corresponding digital signal;
    determination means for determining whether or not a digital signal corresponding to a black image of only a black level meets a criteria; and
    control means for controlling said level adjusting means to change the adjusting coefficient in accordance with the digital signal corresponding to the black image when said determination means determines that the digital signal corresponding to the black image does not met the criteria.

7. An image reading device according to claim 6, wherein said level adjusting means comprises:

an amplifier connected to said image reading means for amplifying the analog signal received from said image reading means and for outputting an amplified analog signal having an amplified voltage level;

voltage dropping means connected to said amplifier for dropping the amplified voltage level of the amplified analog signal; and resistor means connected between said voltage dropping means and said A/D converter, for outputting selective one of a plurality of resistance values, wherein said voltage dropping means drops the amplified voltage level in accordance with the selective one of a plurality of resistance values.

8. An image reading device according to claim 7, wherein the selective one of a plurality of resistance values is selected in accordance with the digital signal corresponding to the black image.

* * * * *